SEMICONDUCTOR MINORITY CARRIER CIRCUITS

Filed March 30, 1959 2 Sheets-Sheet 1

EDWARD DILLINGHAM
JAMES J. NYBERG
INVENTORS
LESTER S. HECHT
BY Arthur Decker
Morris Spector
ATTORNEYS Aug. 21, 1962 E. DILLINGHAM ET AL 3,050,640

SEMICONDUCTOR MINORITY CARRIER CIRCUITS

Filed March 30, 1959

2 Sheets-Sheet 2

EDWARD DILLINGHAM
JAMES J. NYBERG
INVENTORS

LESTER S. HECHT

BY Arthur Decker
Morris Spector

ATTORNEYS

United States Patent Office 3,050,640
Patented Aug. 21, 1962

3,050,640

SEMICONDUCTOR MINORITY CARRIER CIRCUITS

Edward Dillingham, Corona Del Mar, and James J. Nyberg, Torrance, Calif., assignors to Thompson Ramo Wooldridge Inc., Los Angeles, Calif., a corporation of Ohio Filed Mar. 30, 1959, Ser. No. 802,793
4 Claims. (Cl. 307—88.5)

Figure 1:
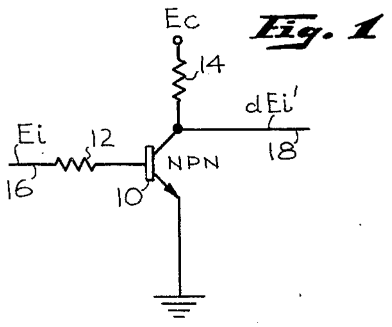

This invention relates to semiconductor circuits and, more particularly, to transistor circuits utilized in computers for gating and storage of signals.

Many types of storage and gating circuits have been developed for electronic computers wherein semiconductor devices such as transistors are employed. These circuits are very satisfactory where computing operations at relatively low speeds are permissible, but are disadvantageous where high speed switching, gating, storage, etc. are required. Transistors have generally been considered as slow electronic devices, the attributed reason being the continued presence of carrier current in the transistor after input energization has been removed, and even after the application of input energization tending to drive the transistor out of saturation.

According to the present invention, on the other hand, full advantage is taken of the presence of carriers which are created in a semiconductor element, such as a transistor, by very simple circuit arrangements, to make possible unusually high speed gating and other logic for a computer. In addition, use is made of minority carrier storage inherent in the transistor to permit the operation of the transistor circuit to accomplish a time delay, i.e., operate as a memory device. The significance here is that each gating circuit, for instance, has inherent memory, which may be utilized to supplant other memory devices, such as flip-flops, delay lines, etc., required in the particular computing system.

In a basic form of the invention, the semiconductor device is of the form of a transistor which is connected to a pulse generator to receive input signals betwen, for instance, its base and emitter electrodes. The input signals are effective to modify or not modify the minority carrier condition in the transistor. A second pulse generator is connected between the collector electrode and either of the input electrodes, and operates to pass current through the transistor if a particular carrier condition prevails or to produce an output signal across a load if another carrier condition prevails. Thus, the appearance of an output signal across the load upon application of a pulse from the second generator is determined by the nature of the carrier condition priorly established in the transistor by a pulse from the first generator.

According to the basic concept, the operating cycle of a circuit constructed as taught by the invention is in two phases, the first of which establishes a predetermined carrier condition in a semiconductor (exemplified by the transistor), and the second of which produces an output signal representing the carrier condition resulting from the first phase of operation. Since, in particular, computer utilization of the invention is contemplated in this specification, the two phases will be illustrated as portions of a computer digit period, the beginning of which is establishd by the trailing edge of the pulse from a first pulse generator and the second phase being established by the trailing edge of the pulse from a second pulse generator. Where, as is common, the operating phases are equal, it is obvious that a single pulse generator will suffice if the complement of its output is made available.

Circuitry designed to utilize the principle of the invention may be characterized by exceptionally fast response and high efficiency in providing all of the logic and memory required in a computer, and representative species wil be described herein as fulfilling these objects.

Another object of the invention is to provide means for reducing the number of flip-flops or other storage elements required in a computer.

A further object of the invention is to provide circuitry adaptable to perform logic and/or memory functions in computers or other equipment, said circuitry having similar and commensurate operating characteristics regardless of the particular application.

In addition, features of the invention will be shown to provide general adaptability to non-linear pulse circuits such as binary, decimal and other counters, shift registers, delay circuits, regenerative amplifiers, etc.

Figure 2:
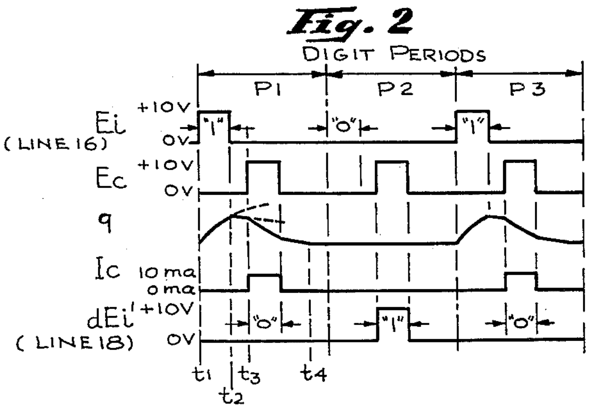
Figure 3:
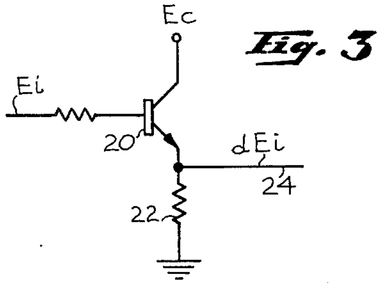
Figure 4:
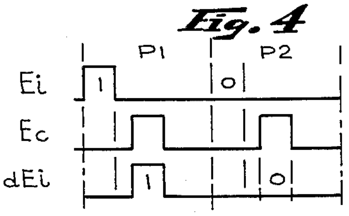
Figure 5:
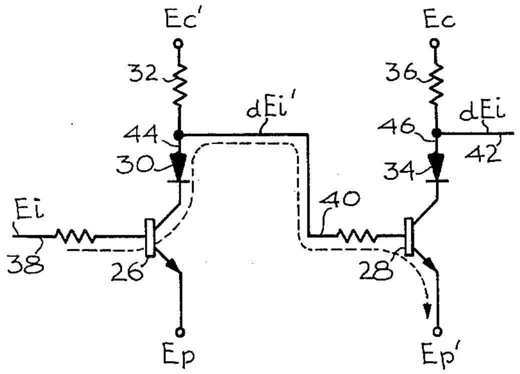
Figure 6:
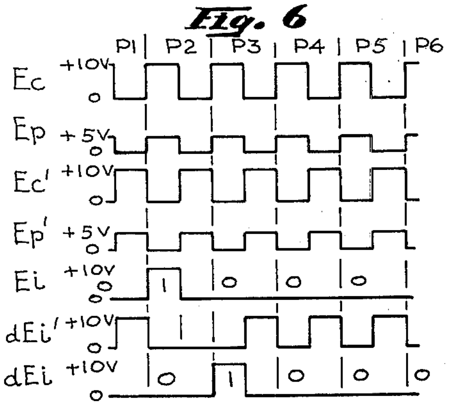
Figure 7:
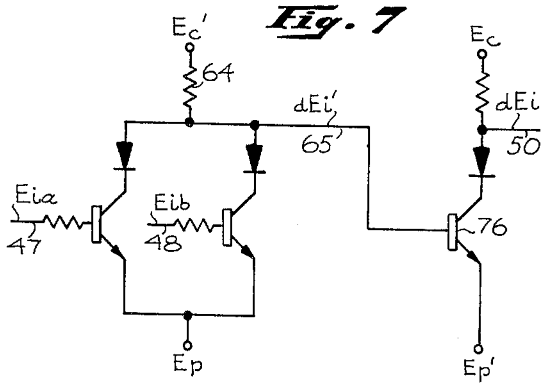
Figure 8:
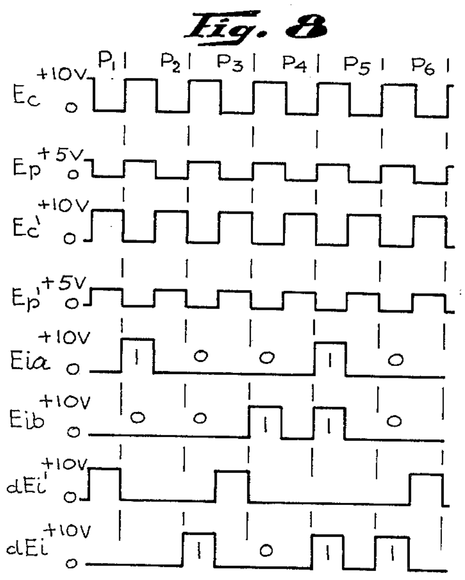
Figure 9:
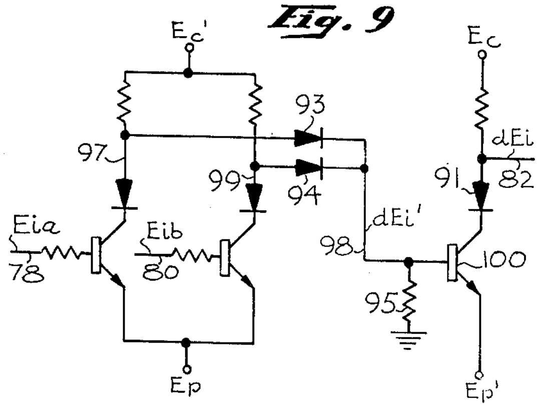
Figure 10:
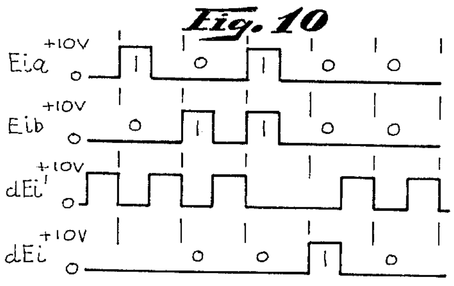
Figure 11:
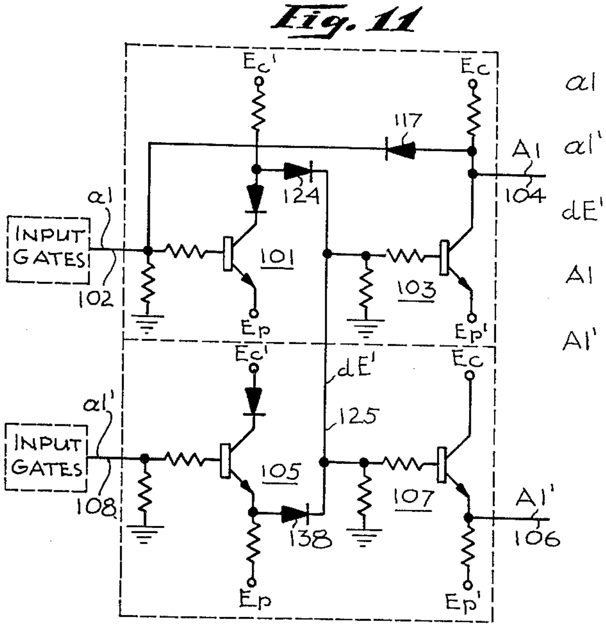
Figure 12:
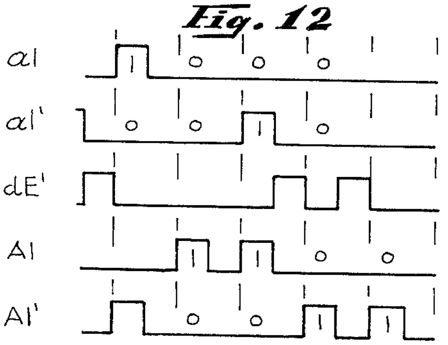

Other objects and advantages of the invention will be apparent to those skilled in the art from the following description and the attached drawings, in which:

FIGURE 1 is a schematic diagram of a circuit according to the invention which will operate to delay and complement an input signal;

FIGURE 2 contains waveshape graphs illustrating the operation of the circuit of FIGURE 1;

FIGURE 3 is a schematic diagram of a circuit according to the invention which will operate to delay and not complement an input signal;

FIGURE 4 contains waveshape graphs illustrating the operation of the circuit of FIGURE 3;

FIGURE 5 is a schematic diagram of circuits of the invention connected in cascade;

FIGURE 6 contains waveshape graphs illustrating the operation of the circuit in FIGURE 5;

FIGURE 7 is a schematic diagram of an "or" circuit having a delay;

FIGURE 8 contains waveshape graphs illustrating the operation of the circuit of FIGURE 7;

FIGURE 9 is a schematic diagram of an "and" circuit having a delay;

FIGURE 10 contains waveshape graphs illustrating the operation of the circuit of FIGURE 9;

FIGURE 11 is a schematic diagram of a flip-flop circuit according to the invention; and FIGURE 12 contains waveshape graphs illustrating the operation of the circuit of FIGURE 11.

When a transistor is employed as a switch or in a regenerative pulse circuit, it is usually operated from the cut-off to the saturated states. The operating point traverses the collector characteristic curve family from emitter current cut-off, where the emitter-base junction of the transistor is reverse-biased, to emitter current saturation, where the collector-base junction of the transistor is forward biased.

Conduction in transistors is by the movement of carriers, classified according to their relative quantities as majority or minority; it is the passage of minority carriers through the base region from emitter to collector that is the essence of transistor action.

While the transistor is in the saturated state, extra minority carriers are injected into the base region of the base-emitter junction; these minority carriers diffuse and combine with majority carriers in the base region. In switching the transistor to cut-off, considerable time is required before collector current ceases and reverse collector potential can be restored. This is because the rate of decay of minority carriers in the base region is not instantaneous. This effect has previously been considered a limitation of transistor performance in circuitry especially with regard to speed of response, but, now will be demonstrated as advantageous when circuitry is arranged and signals are generated with regard thereto.

In circuits of the invention, the carrier state is established before application of collector potential and remains established until after the potential is removed;

therefore the time required for a change in current conduction in the transistor is not dependent on inherent transistor action but rather on the rate of rise and fall of applied collector potential. Thus a transistor may be operated at a much higher repetition rate than is possible wtih conventional circuitry.

Although the inventive concept is quite applicable to other systems of representing information, it will be presented herein with regard to a synchronized pulse system. By this is meant a system in which repetitive pulses, whether information-representing, or "clock" signals or otherwise, are synchronized to occur at particular time intervals with reference to each other. In such a system, signals may be of square waveshape alternating between, for instance, +10 volts and zero volts (ground potential) present on a line; the former potential may represent a "binary digit 1" and the latter potential may represent a "binary digit 0," as regarded during the time interval when information is considered to be manifested. Thus, in a computer, for example, if information is relevant only during clock periods, a potential of +10 volts on a line will be considered as a digit 1, and a potential of 0 volts will be considered as a digit 0; other than during the clock period the potential of the line is not relevant as representing information.

Referring now to FIGURE 1, here is shown a circuit according to the invention which will operate on input signals E*i* to provide a delayed and complemented replica, signals *d*E*i*'. The circuit includes transistor 10, illustrated as of the NPN type, having its base electrode connected to a source (not shown) of input signals E*i* through resistor 12 and line 16, its emitter electrode grounded, and its collector electrode connected to a source (not shown) of clock signals E*c* through resistor 14. Output from the circuit is taken on line 18. The operation of the circuit of FIGURE 1 will be explained with reference to the waveshape graphs of FIGURE 2, which shows three seqential digit periods labeled P1, P2 and P3, respectively, of operation of a computer or similar system. As previously pointed out, the digit periods are each divided into two parts as established by the synchronization of pulses of signals E*i* and E*c* and a line such as lines 16 and 18 may be regarded as representing information only during the time interval when such pulses may occur; thus, for example, signal E*i* may be represented as a binary digit 1 during digit periods P1 and P3 and a binary digit 0 during digit period P2.

For purposes of illustration, energizing signals will have square waveforms and the time interval during which signal E*i* may represent a binary digit is shown to be prior in its entirety to the time interval during which signal E*c* is at a relatively high potential level. Thus, during period P1, signal E*i* switches from 0 volts to +10 volts and back to 0 volts before signal E*c* switches from 0 volts to +10 volts and back to 0 volts. Satisfactory operation of the invention will be attained with a time interval between the trailing edge of the pulse of signal E*i* and the leading edge of the pulse of signal E*c* as short as desired, but should not be so long as to permit recombination of all carriers in the base region of the particular transistor selected for use. This recombination will of course, occur exponentially with time, the rate being established by the type of semiconductor material, its temperature, its geometry, applied voltages, and similar well-known considerations. The status of minority carriers not yet recombined at a particular time after dissipation of the pulse of signal E*i*, therefore, comprises a volatile "memory" of the application of the signal. This memory characteristic comprises a storage factor and is designated as storage content *q* in FIGURE 2.

The curve for storage content *q* shows, starting at time *t1*, an exponential increase during application of input energization, the pulse of signal E*i* during period P1, to the base electrode of transistor 10 (FIGURE 1), which increase is interrupted by the removal of this energization at time *t2*. At time *t2*, carriers start to recombine and, for this circuit configuration, storage content *q* decreases gradually and ordinarily would continue to diminish to zero, and collector current I*c* would not flow. However, at time *t3*, energization by the pulse of signal E*c* occurs at the collector electrode of transistor 10 and there is a coincidence of collector energization and presence of stored minority carriers; therefore, storage content *q* decreases rapidly and collector current I*c* rises sharply and is maintained as long as there are minority carriers as yet uncombined. The effect of this current is to maintain line 18 at ground potential, as indicated in the delay-complement curve designated *d*E*i*'. At time *t4*, all carriers have been recombined, and storage content *q* is essentially zero. The net result of this arrangement of circuitry and signal energization for period P1 is thus to provide a delayed binary digit 0 output on line 18 corresponding to a binary digit 1 input on line 16.

For period P2, the example of FIGURE 2 shows no signal energization on line 16. As a consequence, there is no formation of minority carriers during the time when signal E*i* is designated as representing a binary digit 0 and storage content *q* remains low. When signal E*c* rises in value, there is no current I*c*, no short circuiting effect through transistor 10 and the potential of line 18 thus rises to a level representative of a binary digit 1. For period P2, then, there is provided a delayed binary digit 1 output on line 18 corresponding to a binary digit 0 input on line 16.

During period P3 activity is a repetition of that of period P1 described above.

In summary, therefore, in the circuit of FIGURE 1, for a serial input representation on line 16 of binary digits 101 there is provided a delayed and complementary serial output representation on line 18 of binary digits 010.

If the complement feature demonstrated above is not desired in the logic of the computer system, the circuit of FIGURE 3 may be used to operate on an input signal E*i* to provide an output signal *d*E*i* with prescribed delay only.

The circuit of FIGURE 3 is generally similar to that of FIGURE 1 with the exception that the collector resistor of transistor 20 is omitted, the emitter is connected to ground through resistor 22 and output is taken from the emitter on line 24. In this type of arrangement, the emitter potential tends to "follow" the input potential, and the waveshape graphs of FIGURE 4 indicate, that for a serial input E*i* representing the binary digits 10, there is provided a delayed serial ouput *d*E*i* characterized by the same binary digit representation. Analysis of FIGURE 4 provides the same type of operation for the circuit of FIGURE 3 as the preceding analysis of FIGURE 2 has provided for the circuit of FIGURE 1, and so will not be repeated here.

FIGURE 5 demonstrates how the circuits of the invention may be cascaded in two stages to provide a digit period delay for an input signal, utilizing, for instance, "two-phase logic," which will connote a logical system in which digit representation is regarded during digit periods established by a pair of clock signals having predetermined synchronization. These clock signals alternate between 0 volts and +10 volts, are complementary, and accordingly are designated E*c* and E*c*'. In addition, it is desired to employ clock signals which have symmetrical square waveshapes, for elimination of the delay required to insure recombination of all transistor minority carriers generated by an input pulse prior to energization by a successive input pulse. This function is contributed by an additional pair of signals, one synchronized with each of the clock signals E*c* and E*c*' and designated respectively, E*p* and E*p*'. Signals E*p* and E*p*' are thus also complementary, alternate between 0 volts and +5 volts, and are at the latter level when signals E*c* and E*c*', respectively, are at the +10 volt level. As a result, signal E*p* effectuates immediate recombination of priorly established carriers in transistor 26 (FIGURE 5) when signal E*c* is at +10 volts, i.e., during the time when signal E*i* is regarded as representing digit information, and signal E*p'* accomplishes this function for transistor 28 when signal *Ec'* is at +10 volts, i.e., during the time when signal E*i* is not regarded as representing digit information. In the circuit, the emitters of transistors 26 and 28 are consequently returned to the sources (not shown) of signals *Ep* and E*p'* respectively, instead of to ground potential as in FIGURE 1. Additionally, diodes 30 and 34 are connected between the collectors of transistors 26 and 28, respectively, and the collector resistors 32 and 36, respectively, for each cascaded stage, the diodes being poled with the anode electrode connected to the resistor and the cathode electrode connected to the collector, output from the stage being taken from the junction of the anode of the diode and the resistor. The function of diodes 30 and 34 is to inhibit any flow of current from input through the base-collector path of a transistor and the base-emitter path of the succeeding transistor during time intervals when signal E*i*, on line 38 may be at +10 volts. This path is shown in dashed line in FIGURE 5 for transistors 26 and 28.

FIGURE 6 contains waveshape graphs illustrating the operation of the circuit of FIGURE 5 for six sequential digit periods, P1 through P6; only those parts of periods P1 and P6 which are relevant to an understanding of the example are shown, however. The relationship of signals E*c*, E*c'*, E*p*, and E*p'* are here indicated as well as operative amplitudes. Due to the symmetry of the waveshapes of the clock signals, each digit period is in two equal parts, the digit representation of signal E*i* on line 38 (FIGURE 5) being during the first half of a digit period, the corresponding digit representation of signal *d*E*i'* on line 40 being during the second half of the same digit period and the corresponding digit representation of signal *d*E*i* on line 42 being during the first half of the succeeding digit period. Thus, in accordance with the principles already discussed, it is apparent that signal *d*E*i'* is a complemented version of signal E*i* with a half digit period delay, while signal *d*E*i* on line 42 is an uncomplemented replica of signal E*i* with a full digit period delay; the example of FIGURE 6 shows signal E*i* having the sequential values 01000 for periods P1 through P5, signal *d*E*i'* having a pulse during the second halves of periods P1, P3, P4 and P5, and signal *d*E*i* having the values 01000 delayed by a full digit period (i.e., for periods P2 through P6).

With regard to the operation of the circuit of FIGURE 5 exemplified in FIGURE 6, during the first half of period P1 input energization (a pulse of signal E*i*) had not been presented to transistor 26. During the second half of period P1, then ,there is no carrier storage content in transistor 26. As a result, transistor 26 is non-conductive and presents a high impedance in line 44. At this time also, signals E*c'* and E*p'* are at +10 volts and +5 volts respectively, and signals E*c* and E*p* are at ground potential. Transistor 28 thus receives input energization (signal *d*E*i'*) since line 40 is at the potential level of signal E*c'* (+10 volts). Carrier charge is consequently accumulated in transistor 28 during the second half of period P1.

During the first half of period P2, signals E*c* and E*p* are at +10 volts and +5 volts respectively, and signals E*c'* and E*p'* are at ground potential. Input energization is thus removed from transistor 28 signal *d*E*i'* on line 40 drops to ground potential), but, due to accumulated carrier charge, transistor 28 presents an effective short circuit at line 46 to signal E*c*. Signal *d*E*i* consequently remains at ground potential. Also at this time, input energization is presented to transistor 26 (signal E*i* is at +10 volts) and carrier charge starts to accumulate in transistor 26.

Briefly, then, the state of signal *d*E*i'* during the second half of period P1 and the state of signal *d*E*i* during the first half of period P2 correspond to the state of signal E*i* during the first half of period P1.

During the second half of period P2, signals E*c'* and E*p'* are again at +10 volts and +5 volts respectively, and signals E*c* and E*p* are again at ground potential. Signal *d*E*i'* remains at ground potential; hence carrier charge does not accumulate in transistor 28.

During the first half of period P3, signals E*c* and E*p* are again at +10 volts and +5 volts respectively, and signals E*c'* and E*p'* are again at ground potential. Since there is no carrier charge in transistor 28, signal *d*E*i* is permitted to follow signal E*c* and line 42 rises to the +10 volt level.

Briefly, then, the state of signal *d*E*i'* during the second half of period P2 and the state of signal *d*E*i* during the first half of period P3 corresponds to the state of signal E*i* during the first half of period P2.

The activity of the circuit of FIGURE 5 through the other digit periods of the example of FIGURE 6 may be analyzed similarly to the above.

The circuits of the invention may be used to perform logical operation which may be represented in the form of logical equations. Thus, circuits utilizing the invention may be arranged as gates to provide the logical "or" operation and the logical "and" operation.

Accordingly, the circuit of FIGURE 7 is an "or" gate, which also provides a full digit period delay. As with previously described circuits two-phase logic will continue to be illustrated, and signals E*c*, E*c'*, E*p* and E*p'* are defined as before.

The "or" gate of FIGURE 7, accommodates, for illustration, two input signals E*ia* and E*ib*, on lines 47 and 48, respectively. Signals E*ia* and E*ib* are at the logical levels previously stipulated (+10 volts and 0 volts) and may be the outputs of logical gates or flip-flops constructed in accordance with this invention or otherwise generated. As heretofore mentioned, a synchronized system is contemplated and signals E*ia* and E*ib* consequently represent digital information only during the time when clock signal E*c* is at +10 volts (the first half of every digit period). The output of the "or" gate is designated as signal *d*E*i*, on line 50, and is characterized by a full digit period delay from either signal E*ia* or E*ib* or both.

The "or" gate of FIGURE 7 consists of a pair of input circuits similar to the circuit of FIGURE 1, one for each of the input signals E*ia* and E*ib*, and a common output circuit as described with reference to FIGURE 5. In practice, as shown, it will be found feasible to utilize, for all input circuits of the "or" gate, a common collector resistor 64. Input resistors may also be connected across the sources of signals E*ia* and E*ib*, if desired. The input circuits are effectively in parallel and a common output, signal *d*E*i'*, on line 65, provides input to the base of transistor 76.

Referring now to FIGURE 8, here are shown waveshape graphs of an illustrative operation of the "or" gate of FIGURE 7. For digit periods P2 through P6, input signal E*ia* is characterized by the serial values 10010 whereas the corresponding values of input signal E*ib* are 00110. Consequently, at least one of the signals E*ia* and E*ib* is at the +10 volt level during periods P2, P4 and P5. Following the line of reasoning already laid down for FIGURES 2 and 6, the resultant values for signal *d*E*i* are derivable as 1011 during periods P3 through P6, respectively.

It is thus seen that the Boolean logical equation representing the operation of the circuit of FIGURE 7 is *d*E*i*=E*ia*+E*ib*.

FIGURE 9 shows the circuit of a logical "and" gate which provides a full digit period delay.

The logical "and" gate is comprised of a pair of input circuits similar to the circuit of FIGURE 1, one for each of the input signals E*ia* and E*ib* on lines 78 and 80, respectively, a common output circuit as described with reference to FIGURE 5 and a pair of diodes. One, diode 93, is connected with its anode to the output, on line 97, of the signal E*ia* input circuit; the other, diode 94, is connected with its anode to the output, on line 99, of the signal E*ib* input circuit. The cathodes of diodes 93 and 94 are connected together and to the junction of the base of transistor 100 and resistor 95, the other end of resistor 95 being grounded. In this circuit, diodes 93 and 94 and resistor 95 provide the logical "and" function illustrated in the example of FIGURE 10, which includes only input and output waveshapes and presumes reference to FIGURE 8 for digit period significance and signals E*c*, E*p*, E*c'* and E*p'*.

Here, inputs to the "and" gate, signals E*ia* and E*ib*, on lines 78 and 80, respectively, have the respective digital values 10100 and 01100 for digit periods P2 through P6. Consequently, there is a coincidence of signals E*ia* and E*ib* at the +10 volt level during period P4. It may be seen that signal *d*E*i'*, on line 98 attains the +10 volt level during all digit periods except that at which both signals E*ia* and E*ib* represent a binary digit 1. The resultant digit values of output signal *d*E*i*, on line 82, are 0010 for digit periods P3 through P6, respectively.

It is thus seen that the Boolean logical equation representing the operation of the circuit of FIGURE 9 is *d*E*i*=E*ia* E*ib*.

It is further evident that gates such as exemplified in FIGURES 7 and 9 may be cascaded according to principles taught in connection with FIGURE 5 to thereby provide additional delays in multiples of a digit period.

FIGURE 11 is a circuit according to the invention which operates as a flip-flop in the two-phase logic system employed for illustration here.

The flip-flop output signals are complementary and designated as signals A1 and A1', the corresponding input signals are designated as *a*1 and *a*1', clock signals and digit periods are as previously discussed, and all signals are characterized by the +10 volt and 0 volt levels. The "true" state of the flip-flop is that in which, for the first half of a digit period, signal A1 is at the +10 volt level and signal A1' is at the 0 volt level; the "false" state of the flip-flop is that in which, for the first half of a digit period, signal A1 is at the 0 volt level and signal A1' is at the +10 volt level. From prior discussion, it will be apparent that, for the second half of a digit period, both signals A1 and A1' will be at the 0 volt level, and that trigger input (i.e., a rise in the level of signal *a*1 or *a*1' to +10 volts) may be applied only during the first half of a digit period, coincidence of a rise in level of signals *a*1 and *a*1' being avoided. The true and false states of the flip-flop will further be considered as representing a binary digit 1 and a binary digit 0, respectively.

An examination of the circuit of FIGURE 11 will indidicate that the flip-flop includes four transistor stages, 101, 103, 105 and 107. Stages 101 and 103 are constructed and operate in accordance with the teachings exemplified by FIGURE 5 while stages 105 and 107 are each substantially the circuit of FIGURE 3. However, it will be noted that diodes 124 and 138 are connected in the output circuits of stages 101 and 105, respectively, the diodes being poled with their anodes at the stage output electrode and their cathodes being interconnected via line 125 at the inputs to stages 103 and 107. Further provided is diode 117, connected with its anode at the output of stage 103 and its cathode at the input of stage 101. Inputs to the flip-flop (signals *a*1 to stage 101 on line 102 and signal *a*1' to stage 105 on line 108) are from input gates, which, in turn, may be energized by outputs from similar flip-flops, amplifiers, etc.

Outputs from the flip-flop (signals A1 and A1' on lines 104 and 106, respectively) may be connected to gates or other elements in the computer system.

With regard to operation, it should now be understood that stages 101 and 105 are connected to provide, on line 125, a signal *d*E' which will be at the +10 volt level during the second half of a digit period in which there occurs a signal input pulse *a*1' on line 108. Diodes 124 and 138 are employed for isolation to prevent any interaction between stages 101 and 105 and consequent deterioration of signal *d*E'. A +10 volt level of signal *d*E' establishes minority carriers in the transistors of stages 103 and 107, which, in turn, effectuates a subsequent +10 volt level of signal A1' on line 106, signal A1 on line 104 remaining at the 0 volt level. This condition (i.e., a false state of the flip-flop) is automatically maintained during the next digit period since a signal *a*1 pulse is not present. If, however, a signal *a*1 input pulse occurs during a digit period, signals *d*E' and A1' drop to the 0 volt level and signal A1 rises to the +10 volt level; therefore during the next following digit period, a pulse is fed back to input *a*1 through diode 117. This condition (i.e., a true state of the flip-flop) is thus automatically maintained during subsequent digit periods, unless a signal *a*1' input pulse occurs.

FIGURE 12 shows the waveshape graphs of pertinent signals for an example of the operation of the flip-flop circuit of FIGURE 11. The example shows signal *a*1 with the digital values 1000 and the signal *a*1' with the digital values 0010 during the periods P2, P3, P4 and P5, respectively; the resultant output signals A1 and A1' have the respective digital values 1100 and 0011 during the periods P3, P4, P5 and P6, respectively.

It is to be understood that the concept of the invention whereby minority carrier storage in transistors is utilized is not limited to the particular applications illustrated herein. It is further understood that numerous embodiments other than those illustrated, in teaching the basic concept of the invention will occur to those skilled in the art; for example, PNP transistors could be employed in place of the NPN transistors disclosed by appropriately reversing polarities of various signals, vacuum tube diodes may be employed instead of the semiconductor diodes shown, and other semiconductor devices than transistors may be employed.

It should be further understood that while clock signals E*p* and E*p'* may be desirable to use, they are not essential to the operation of the circuits of the invention but are used to eliminate a time delay required to insure recombination of all transistor minority carriers generated by a previous input pulse or stage of the circuit. It should further be understood that while the invention shows signals E*c* and E*p* and their complements signals E*c'* and E*p'* as though provided by separate generators, signal E*p* could be obtained as a function of signal E*c*, and signal E*p'* could be obtained as a function of signal E*c'* by means of voltage divider networks or other suitable provision. Also, although the invention shows signals E*c* and E*p*, and their complements signals E*c'* and E*p'* as formulating symmetrical digit periods, such symmetry is not essential to the operation of the circuits of the invention.

In summary, this invention is intended to include all modifications falling within the scope of the following claims.

We claim:

1. In a data processing system including a source of binary coded information represented by first and second voltage levels of a bilevel signal and a source of complementary first and second clock signals, each clock signal defining a series of periodically recurrent pulses of like duration and polarity with the period between the beginning of immediately successive pulses defining the length of a digit period; an information storage circuit for providing a one digit period delay comprising: first and second semiconductor devices each capable of having established therein a condition of carrier storage; means applying said bilevel signal to the input of said first semiconductor device during a first portion of each digit period such that said condition of carrier storage is established therein in response to the application of said first voltage level but not in response to said second voltage level; means applying a pulse of said first clock signal to said first semiconductor device during a second portion of each digit period, subsequent to the completion of said first portion, for generating a signal in accordance with the establishment of said condition of carrier storage in said first semiconductor device; means applying said generated signal to the input of said second semiconductor device; and means applying a pulse of said second clock signal to said second semiconductor device during first portion of each digit period for producing an output signal corresponding to said bilevel signal one digit period earlier.

2. In a data processing system including a source of binary coded information represented by first and second voltage levels of a bilevel signal and a source of complementary first and second clock signals, each clock signal defining a series of periodically recurrent pulses of like duration and polarity with the period between the beginning of immediately successive pulses defining the length of a digit period; an information storage circuit for providing a one digit period delay comprising: first and second semiconductor devices each capable of having established therein a condition of carrier storage; means applying said bilevel signal to the input of said first semiconductor device during a first portion of each digit period such that said condition of carrier storage is established therein in response to the application of said first voltage level but not in response to said second voltage level; means applying a pulse of said first clock signal to said first semiconductor device during a second portion of each digit period, subsequent to the completion of said first portion, for generating a signal in accordance with the establishment of said condition of carrier storage in said first semiconductor device; means applying said generated signal to the input of said second semiconductor device; means applying a pulse of said second clock signal to said second semiconductor device during a first portion of each digit period for producing an output signal corresponding to said bilevel signal one digit period earlier; a source of complementary first and second recombination signals, each recombination signal defining a series of periodically recurring pulses of like duration and polarity; and means applying a pulse of said first and second recombination signals respectively to said first and second semiconductor devices simultaneously with the application of signals to the input thereof to eliminate carrier storage therein.

3. In a data processing system including a source of binary coded information represented by first and second voltage levels of a bilevel signal and a source of complementary first and second clock signals, each clock signal defining a series of periodically recurrent pulses of like duration and polarity with the period between the beginning of immediately successive pulses defining the length of a digit period; an information storage circuit for providing a one digit period delay comprising: first and second semiconductor devices each capable of having established therein a condition of carrier storage; means applying said bilevel signal to the input of said first semiconductor device during a first portion of each digit period such that said condition of carrier storage is established therein in response to the application of said first voltage level but not in response to said second voltage level; means applying a pulse of said first clock signal to said first semiconductor device during a second portion of each digit period, subsequent to the completion of said first portion, for generating a signal in accordance with the establishment of said condition of carrier storage in said first semiconductor device; means applying said generated signal to the input of said second semiconductor device; means applying a pulse of said second clock signal to said second semiconductor device during a first portion of each digit period for producing an output signal corresponding to said bilevel signal one digit period earlier; and unilaterally conductive means connected to said first and second semiconductor devices operable to prevent dissipation of said signals applied to the inputs thereof during the establishment of the condition of carrier storage therein.

4. An information storage circuit useful in a digital data processing system in which system an alternating current clock signal is provided, said clock signal defining a series of periodically recurrent pulses of like duration and polarity, the period between the beginning of immediately successive pulses in turn defining the length of a digit period within the system, each digit period being itself composed of first and second portions of given durations, said pulses being further defined by periodically recurrent pairs of amplitude excursions, the first excursion of each pair reaching a first given magnitude during said first portion of each digit period and the second excursion of each pair reaching a second different given magnitude at a time not after the beginning of said second portion of each digit period, said storage circuit comprising: a semiconductor device capable of having established therein a condition of minority carrier storage in response to input signal current thereto of a first given current polarity and is in excess of a first predetermined current value; means applying to said device a data input signal isochronally related to said clock signal of said system and conditionally defining a data pulse of given duration representing a data bit, said data pulse being substantially completely defined within the first portion of a digit period and commencing at the beginning thereof, said data pulse being of such polarity and of sufficient magnitude to produce an input current flow to said device of said first given current polarity and substantially in excess of said first predetermined current value; a load circuit connected to said device for developing an output signal in response to output current flow through said device; means applying to said device an alternating current operating signal isochronally related to said clock signal and having a periodically recurrent operating pulse component commencing at the beginning of the second portion of each digit period, after the termination of any data pulse and terminating before the end of the second portion of a digit period, said operating pulse component being of such polarity as to produce output current flow in said device based upon stored minority charge carriers therein with the same current polarity as that caused by said data pulse; means applying to said device another alternating current input signal isochronally related to said clock signal and having a periodically recurrent pulse component occurring during an interval entirely within the first portion of a digit period and of a polarity and magnitude which produces, in the presence of stored minority charge carriers and in the absence of a concurrent data pulse to said device, an input current within said device of a second current polarity opposite to said first given current polarity produced by said data pulse and of a second magnitude less than said first predetermined current value, to produce a substantial current flow through said load circuit only during the second portion of those digit periods in which during the first portion thereof, a data pulse has been applied to said device, whereby voltage pulses are caused to appear across said load circuit each of which represents one data bit delayed in time by an amount equal to said first portion of a digit period.

References Cited in the file of this patent

UNITED STATES PATENTS 2,866,105 Eckert ---------------- Dec. 23, 1958

OTHER REFERENCES

Transistor Circuits, by Cattermole, page 264, London, Heywood & Co., Ltd., 1959.